Oct. 22, 1957 — A. P. LYON — 2,810,199
STRAND MEASURING DEVICE
Filed Jan. 25, 1955 — 2 Sheets-Sheet 1

INVENTOR.
ARTHUR P. LYON,
BY: Harold B. Hood.
ATTORNEY

Oct. 22, 1957  A. P. LYON  2,810,199
STRAND MEASURING DEVICE
Filed Jan. 25, 1955  2 Sheets-Sheet 2
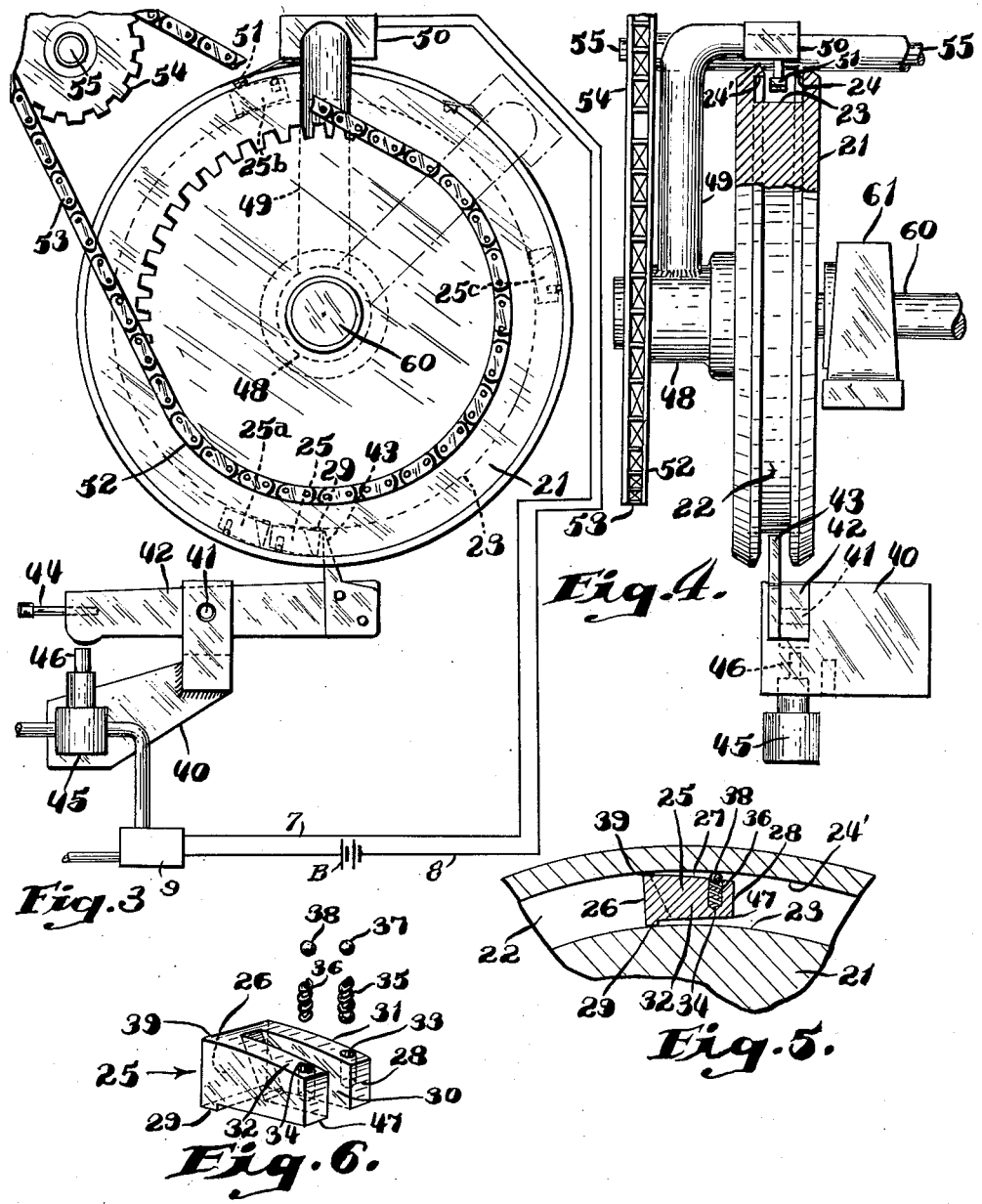
INVENTOR.
ARTHUR P. LYON,
BY Harold B. Hood.
ATTORNEY United States Patent Office 2,810,199
Patented Oct. 22, 1957

2,810,199

STRAND MEASURING DEVICE

Arthur P. Lyon, Crawfordsville, Ind.

Application January 25, 1955, Serial No. 484,012

7 Claims. (Cl. 33—130)

The present invention relates to a strand measuring device, and more particularly to a novel means for actuating a mechanism in response to the flow of a predetermined and variable length of a strand past a measuring station.

A primary object of the invention is to provide a device which, after a predetermined degree of rotation, will actuate a switch, or similar device, to cause actuation of an external mechanism.

A further object of the invention is to provide a simple, yet extremely effective, device including a wheel, a plurality of travelers received in a trackway on such wheel and adapted normally to travel with the trackway but so constructed and arranged that, when an obstruction is placed in their path, they may remain stationary while the wheel continues to travel, together with obstructing means for said travelers, an actuator positioned in the path of said travelers and adjustable about the periphery of the trackway relative to the obstructing means, and means whereby passage of a traveler past the actuator will not only result in actuation of an external mechanism, but also result in the release of another traveler, by the obstructing means.

Further objects of the invention will appear as the description proceeds.

The invention finds its primary utility in a machine constructed and designed to withdraw a continuous strand of wire from a storage coil, straighten the wire, bend a portion of the straightened wire into a substantially closed hoop of predetermined radius, and cut off the wire to predetermined lengths; and it has been illustrated, and will be described, in that environment. It will nevertheless be recognized that the invention may have important utility in other environments, and that the external mechanism to be actuated by the measuring device may be, instead of a cut-off mechanism, any kind of mechanism for acting upon the strand, at a point beyond the measuring device, at predetermined intervals, to accomplish any desired function upon the strand.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 3 is a fragmental rear elevation, drawn to an enlarged scale, and illustrating my measuring device;

Fig. 4 is an elevational view, partly in section, and taken from the right of Fig. 3;

Fig. 5 is a fragmentary section drawn to a further enlarged scale; and

Fig. 6 is an enlarged, exploded perspective of a traveler constituting an element of my invention.

Figure 1:
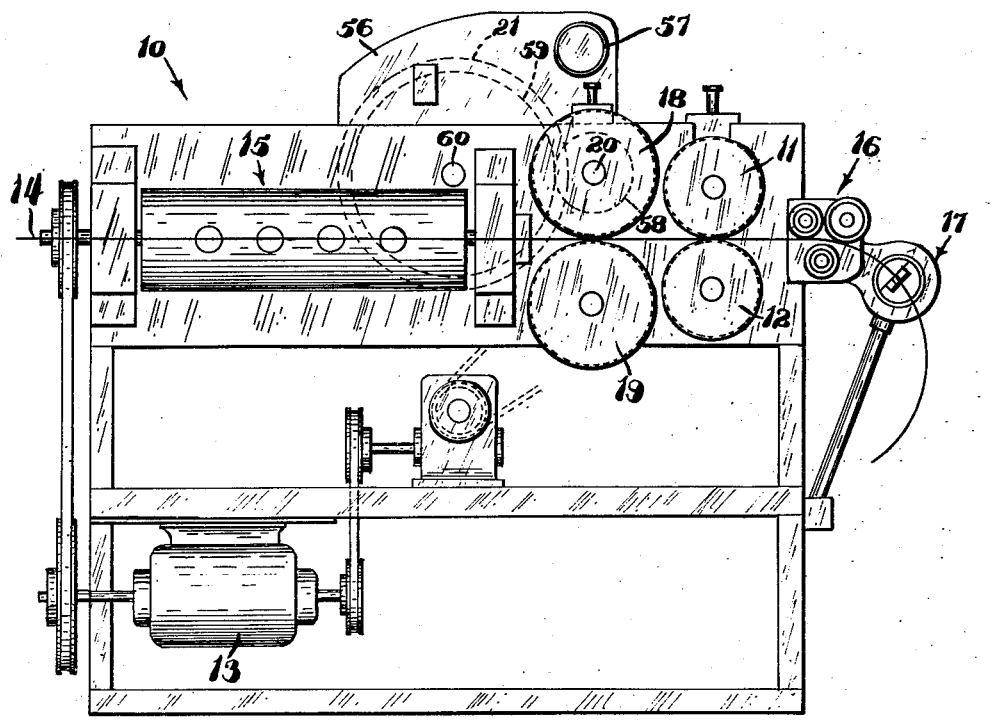
Fig. 1 is a more or less diagrammatic illustration of a machine for producing wire hoops, such machine embodying my strand measuring device.

Referring more particularly to the drawings, the reference numeral 10 indicates generally a machine in which my invention may be used, and comprising a pair of feed rolls 11 and 12 driven from a motor 13 through a conventional drive train, to draw a continuous strand 14 of wire from a storage roll (not shown), through a straightening device indicated generally by the reference numeral 15, to and through a bending mechanism indicated generally by the reference numeral 16, and thence to a cut-off device indicated generally by the reference numeral 17. The straightening means, the bending mechanism and the cut-off device may be of conventional construction.

Between the straightening mechanism 15 and the feed rolls 11 and 12 I provide a wheel 18 which is engaged by the wire strand 14 and which is rotated by the passage of such wire, an idler roll 19 being provided to cooperate with the roll 18 to establish the necessary frictional engagement between the wire strand and the roll 18. Thus, the roll 18 will be driven at a rate which is constantly proportional to the rate of flow of the wire strand past the measuring station.

The roll 18 is fast on a shaft 20 to which is fixed a pinion 58 with which meshes a gear 59 fixed to a shaft 60 suitably journalled in bearings 61 and carrying a wheel 21 connected to rotate therewith. In the illustrated embodiment of my invention, the wheel 21 is formed with a peripheral trackway or channel 22 which opens through the periphery of the wheel, said trackway having a bottom or inner radial wall 23, and the mouth of said channel being guarded by a pair of mutually facing lips which define the top, or radially-outward, walls 24 and 24'.

A plurality of travelers are received in the trackway 22. I have shown four such travelers 25, 25a, 25b and 25c; but as the description proceeds it will become apparent that any suitable number of travelers may be mounted in the trackway, the required number depending somewhat upon the desired adjustment of the entire mechanism.

The several travelers are identical, and therefore only one will be described in detail. The traveler 25 comprises a block whose transverse dimension is substantially equal to the transverse dimension of the channel 22 and greater than the transverse dimension of the mouth of said channel. At its leading end 26, the radial dimension of the block is only slightly less than the radial distance from the wall 23 to the walls 24, 24', of the channel; and the longitudinal or peripheral dimension of the block is greater than the radial distance from the wall 23 to the walls 24, 24' of the channel. The radially outer surface 27 of the block is curved or inclined, whereby the radial dimension of the block diminishes from its forward end 26 to its trailing end 28. At its forward end, the block is formed with a radially-inwardly-extending toe 29, as is most clearly shown in Fig. 5. The block is formed with a longitudinally extending slot 30 opening through its trailing end, said slot defining rearwardly extending legs 31 and 32. Near their rear ends, the legs 31 and 32 are respectively formed with radially extending sockets 33 and 34 in which are received coiled springs 35 and 36 bearing upon balls 37 and 38, said balls resiliently engaging the walls 24 and 24' and tending, therefore, to tilt or cock the block 25 in the channel 22 so that the radially outward corner 39 of the block will engage the walls 24, 24' and the radially inward corner 47 of the trailing end of the block will engage the channel wall 23, thereby establishing a frictional engagement between the block and the channel walls which will cause the block to travel with the wheel.

Mounted adjacent the wheel 21 is a bracket 40 in which is supported a fulcrum pin 41 upon which a lever 42 is oscillably mounted. Adjacent one end, said lever carries a finger 43 which is arranged to be projected into, or withdrawn from, the channel 22; and the finger is so proportioned and designed that, when fully projected into the channel, it will be positioned for engagement by the toe 29 of a traveler approaching the finger during counter-clockwise rotation of the wheel 21, as viewed in Fig. 3. When a block thus engages the finger 43, during rotation of the wheel, it will be canted, against the tendency of the springs 35 and 36, about the toe 29 as a fulcrum, to shift the block corners 47 and 39 out of frictional engagement with the channel walls, so that the traveler may remain stationary while the wheel continues to rotate.

If, now, another traveler, such as 25a, approaches the stationary traveler 25, the toe 29 of the traveler 25a will engage the corner 47 of the traveler 25, whereby the traveler 25a will be similarly canted to release its frictional engagement with the channel walls, and the traveler 25a will likewise be held stationary while the wheel continues to rotate. Thus it will be apparent that all or any part of the travelers currently within the channel 22 may ride freely in the channel, behind the finger 43, while the wheel 21 continues to rotate.

The lever 42 is suitably yieldably biased to its position as illustrated in Fig. 3, in which the finger 43 is fully projected into the channel 22. In the illustrated embodiment of the invention, the lever is thus biased by gravity, being provided, upon the arm opposite that which carries the finger 43, with a counter-weight device 44 which is preferably threadedly engaged in the lever arm for adjustment toward and away from the fulcrum pin 41.

Means is provided for actuating the lever arm 42, against its bias, to withdraw the finger 43 from the channel 22; and such means will preferably be a suitable motor. As illustrated, the actuating means for the arm 42 comprises a fluid motor 45 having a piston 46 gravity biased to its illustrated, retracted position. Upon actuation, the piston 46 will be projected to engage the left-hand arm of the lever 42 to move the same in a clockwise direction to withdraw the finger 43. It will be apparent that the fluid motor might be replaced by, for instance, a solenoid so constructed and designed as to project its core upon energization of its coil.

A collar 48 is mounted for oscillation about the axis of the wheel 21, and carries a radially projecting arm 49 upon which is supported an actuator device. In the illustrated form of the invention, the collar 48 is journalled upon an extension of the shaft 60, and the actuator 50 comprises a normally open micro-switch having a pad 51 so arranged as to project normally into the path of the travelers as they travel with the wheel 21. The construction of the actuator 50 is such that, when a traveler comes into contact with the pad 51, the switch 50 will be momentarily closed, but said switch will reopen immediately after passage of such traveler. The switch 50 is connected in a circuit including a power source B and leads 7 and 8 connected to an electrically-actuated valve 9, through which, upon circuit closure, the motor 45 is actuated to withdraw the finger 43 from blocking projection into the channel 22; and the parts are so arranged that, immediately upon reopening of the said circuit, the finger 43 will be returned into the channel 22. The switch 50 also controls the actuation of a circuit (not shown) which dominates the cut-off device 17 so that, upon closure of the switch 50, the said cut-off mechanism will be actuated.

Thus, a traveler 25b being free to travel with the wheel 21, will move in a counter-clockwise direction about the axis of the shaft 60 until it encounters the pad 51 of the switch 50. Thereupon, the switch and its controlled circuits will be closed and the motor 45 will be energized to actuate the lever 42 to withdraw the finger 43, releasing the traveler 25. The springs 35 and 36 will thereupon shift the traveler into frictional engagement with the walls 23 and 24, 24' and the traveler will begin to move with the wheel. The traveler 25b almost instantaneously leaves the pad 51, to reopen the switch 50, and the finger 43 will thereupon begin to return into the channel 22. The slot 30 in the traveler 25 permits the finger to begin entry into the channel long before the entire length of the traveler 25 has passed the finger, so that the following traveler 25a will be sure to encounter the finger as it approaches the retaining station, so that only one traveler will be released upon any actuation of the lever 42.

The traveler 25c will, of course, encounter the pad 51 to close the switch 50 after approximately 90° of rotation of the wheel 21, with the arm 49 in its illustrated position; and the traveler 25a will thereby be released, while the cut off mechanism 17 will again be actuated. The traveler 25b will encounter the finger 43 shortly before the traveler 25 strikes the pad 51; and the cycle will continue in the indicated manner until the machine is stopped.

Figure 2:
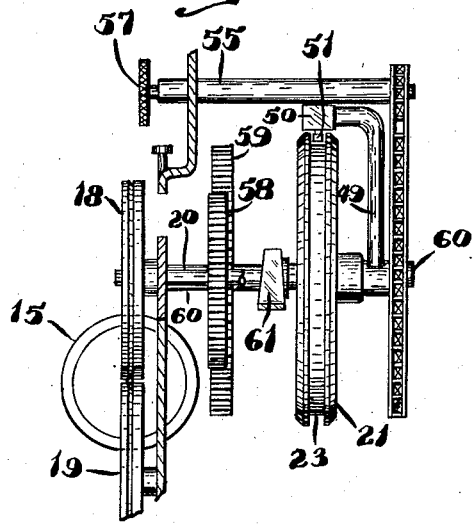
Fig. 2 is a somewhat fragmental end elevation of the machine as seen from the right of Fig. 1.

A sprocket 52 is operatively connected to the collar 48, in the illustrated embodiment of my invention, and a chain 53 is trained about said sprocket 52 and about a second sprocket 54 fixed to a shaft 55 suitably supported from a wall 56 of the machine. The shaft 55 carries an adjusting knob 57 which, as is clearly to be seen from Figs. 1 and 2, is positioned for ready accessibility to the machine operator. By rotating the knob 57, the operator may shift the collar 48, arm 49 and switch 50 about the axis of the shaft 60, without disturbing the relation of the pad 51 to the channel 22, to vary the angular spacing between the finger 43 and the pad 51, thereby to vary the length of strand which will pass the wheel 18 between successive actuations of the cut-off device 17. It will be readily perceived that, as the angular distance between the finger 43 and the pad 51, measured in a counter-clockwise direction, is increased, the number of travelers installed in the channel 22 must be increased. Thus, it would be possible to use two or more travelers when the arm 49 is in the solid line position of Fig. 3, or in any position spaced in a counter-clockwise direction from that solid line position; but, if said arm 49 is shifted into the dotted line position of Fig. 3, then at least three travelers must be used in order to accomplish the intended functions of the machine. Of course, more than the necessary minimum number of travelers may be used in the machine without affecting its operation.

It will be seen that, by the present invention, I have provided a simple, inexpensive mechanism, quite free from problems of lubrication, wear and attritional damage, which is nevertheless highly flexible and very accurate in its operation.

I claim as my invention:

1. A strand measuring device comprising a wheel, means for turning said wheel at a rate constantly proportional to the rate of flow of a strand to be measured, said wheel providing a peripherally-extending trackway, a plurality of travelers retained in said trackway, each of said travelers being yieldably biased toward, but shiftable out of, frictional engagement with the walls of said trackway to travel with said wheel when in such engagement, abutment means mounted adjacent said wheel and shiftable into and out of a blocking position in said trackway in the path of said travelers, said abutment means being yieldably biased toward one of its extreme positions, means cooperating with said abutment means to shift the latter, when actuated, to the other of its extreme positions, an actuator element mounted adjacent said trackway at a point angularly spaced from the position of said abutment means and yieldably held in the path of said travelers, and means operatively connecting said actuator element to actuate said abutment shifting means when said actuator element is engaged by a traveler.

2. The device of claim 1 including an arm mounted for rotational movement about the axis of said wheel, said actuator element being carried on said arm for peripheral adjustment to vary the angular spacing thereof from said abutment means.

3. The device of claim 1 in which each traveler comprises a block having a transverse dimension slightly less than the spacing between opposed walls of said trackway and a dimension, in the direction of rotation of said trackway exceeding the said spacing, and resilient means carried by said block adjacent the trailing end thereof and urging said trailing block end toward one of said walls, said abutment means being proportioned and designed, when in its blocking position, for engagement by that corner of a traveler diagonally related to said resilient means.

4. The device of claim 1 in which said abutment means is biased toward its blocking position in said trackway.

5. The device of claim 4 in which said abutment means includes a lever, a finger carried on said lever, and a motor arranged, upon actuation, to shift said lever against its bias to remove said finger from the path of said travelers, and said actuator element comprises a normally open switch having a shiftable element located in the path of said travelers and shiftable, by engagement with a passing traveler, to switch-closed position, said switch acting, upon closure, to energize an electric circuit for actuating said motor.

6. The device of claim 1 in which said abutment means includes a lever, a finger carried on said lever, and a motor arranged, upon actuation, to shift said lever against its bias, and said actuator element comprises a normally open switch having a shiftable element located in the path of said travelers and shiftable, by engagement with a passing traveler, to switch-closed position, said switch acting, upon closure, to energize an electric circuit for actuating said motor.

7. A strand measuring device comprising a wheel, means for turning said wheel at a rate constantly proportional to the rate of flow of a strand to be measured, said wheel providing a continuous, radially-opening trackway, a plurality of travelers retained in said trackway, each of said travelers comprising a block having, at its leading end, a radial dimension only slightly less than the distance between radially-opposed walls of said trackway, the radial dimension of each block diminishing towards its trailing end, and each block having a peripheral extent greater than said distance, means carried by each block and resiliently urging the trailing end thereof radially inwardly to establish a frictional engagement between said block and said trackway walls whereby said block will travel with said trackway, abutment means mounted adjacent said trackway and including a finger movable substantially radially into and out of said trackway, said finger being proportioned and designed for engagement by the radially inner, leading corner of a traveler block when said finger is in its radially innermost position in said trackway, said abutment means being yieldably biased to said position, motor means mounted for cooperation with said abutment means for withdrawing said finger from the path of said travelers, an electric circuit including a normally-open switch, said circuit being effective, upon closure of said switch, to actuate said motor, said switch being mounted adjacent said trackway, in angularly-spaced relation to said abutment means, and having an actuator arm yieldably extending into said trackway in the path of a traveler therein, said actuator arm being shiftable, by a passing traveler, into switch-closing position.

References Cited in the file of this patent
UNITED STATES PATENTS

| | | |
|---|---|---|
| 2,629,440 | Shaw et al. | Feb. 24, 1953 |
| 2,655,372 | Hempel | Oct. 13, 1953 |